United States Patent
Yu et al.

(10) Patent No.: US 11,270,700 B2
(45) Date of Patent: Mar. 8, 2022

(54) ARTIFICIAL INTELLIGENCE DEVICE AND METHOD FOR RECOGNIZING SPEECH WITH MULTIPLE LANGUAGES

(71) Applicant: LG ELECTRONICS INC., Seoul (KR)

(72) Inventors: Hyun Yu, Seoul (KR); Byeongha Kim, Seoul (KR); Yejin Kim, Seoul (KR); Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 67 days.

(21) Appl. No.: 16/799,727

(22) Filed: Feb. 24, 2020

(65) Prior Publication Data

US 2021/0193138 A1 Jun. 24, 2021

(30) Foreign Application Priority Data

Dec. 19, 2019 (KR) .......................... 10-2019-0170687

(51) Int. Cl.
*G10L 15/22* (2006.01)
*G10L 15/00* (2013.01)
*G10L 15/26* (2006.01)

(52) U.S. Cl.
CPC .......... *G10L 15/22* (2013.01); *G10L 15/005* (2013.01); *G10L 15/26* (2013.01); *G10L 2015/223* (2013.01)

(58) Field of Classification Search
CPC ...................................... G10L 15/22
See application file for complete search history.

(56) References Cited

U.S. PATENT DOCUMENTS

| 2004/0088163 | A1* | 5/2004 | Schalkwyk | G10L 15/187 704/251 |
| 2007/0219797 | A1* | 9/2007 | Liu | G10L 15/08 704/257 |
| 2017/0278514 | A1* | 9/2017 | Mathias | G10L 15/22 |
| 2018/0240456 | A1* | 8/2018 | Jeong | G10L 15/187 |
| 2020/0111484 | A1* | 4/2020 | Aleksic | G10L 15/02 |

* cited by examiner

*Primary Examiner* — Jialong He
(74) *Attorney, Agent, or Firm* — Lee Hong Degerman Kang & Waimey

(57) ABSTRACT

An artificial intelligence device includes a microphone configured to acquire speech including a plurality of languages, and a processor configured to generate, from the speech, text data corresponding to the speech, generate a plurality of pieces of separated data acquired by separating the text data for each language, perform natural language understanding processing corresponding to a language of each of the plurality of pieces of separated data to generate a natural language understanding processing result for each of the plurality of pieces of separated data, acquire command information about a command to be instructed by the speech and slot information about an entity subjected to the command, based on the natural language understanding processing result, perform an operation corresponding to the speech based on the command information and the slot information, and generate a response based on a result of performing the operation.

20 Claims, 12 Drawing Sheets

ARTIFICIAL INTELLIGENCE DEVICE AND METHOD FOR RECOGNIZING SPEECH WITH MULTIPLE LANGUAGES

CROSS-REFERENCE TO RELATED APPLICATIONS

Pursuant to 35 U.S.C. § 119(a), this application claims the benefit of earlier filing date and right of priority to Korean Patent Application No. 10-2019-0170687 filed on Dec. 19, 2019, the contents of which are all hereby incorporated by reference herein in its entirety.

BACKGROUND

The present disclosure relates to an artificial intelligence device and a method for recognizing speech with multiple languages and generating a response.

Recently, devices for receiving a sound and performing a control have been increasing. A device, such as an artificial intelligence (AI) speaker or a smartphone that provides a speech recognition function, recognizes a user's speech and performs a control corresponding to the recognition result or provides a response.

As globalization is in progress, a user's speech often includes a plurality of languages. However, since a speech recognition model classifies each language and processes speech according to each language, a recognition rate for a sentence in which a plurality of languages are mixed is low.

In addition, in the case of a speech command including a plurality of languages, it is difficult to grasp the intent of the speech command and understand the speech command.

SUMMARY

The present disclosure aims to solve the above and other problems.

The present disclosure provides an artificial intelligence (AI) device and a method for recognizing speech with multiple languages.

The present disclosure provides an AI device and a method capable of grasping intent of a speech command by separating speech with multiple languages, performing natural language understanding processing suitable for each language, and then integrating the results of natural language understanding processing.

The present disclosure provides an AI device and a method capable of recognizing a user's speech uttered by using a plurality of languages and performing an operation corresponding to the speech.

The present disclosure provides an AI device and a method for generating a response speech by selecting an appropriate language if the response speech is generated after processing a speech command.

In one embodiment of the present disclosure, a method for recognizing speech with multiple languages includes acquiring speech including a plurality of languages, generating, from the speech, text data corresponding to the speech, generating a plurality of pieces of separated data acquired by separating the text data for each language, performing natural language understanding processing corresponding to a language of each of the plurality of pieces of separated data to generate a natural language understanding processing result for each of the plurality of pieces of separated data, acquiring command information about a command to be instructed by the speech and slot information about an entity subjected to the command, based on the natural language understanding processing result, performing an operation corresponding to the speech based on the command information and the slot information, and generating a response based on a result of performing the operation.

In one embodiment of the present disclosure, an artificial intelligence device includes a microphone configured to acquire speech including a plurality of languages, and a processor configured to generate, from the speech, text data corresponding to the speech, generate a plurality of pieces of separated data acquired by separating the text data for each language, perform natural language understanding processing corresponding to a language of each of the plurality of pieces of separated data to generate a natural language understanding processing result for each of the plurality of pieces of separated data, acquire command information about a command to be instructed by the speech and slot information about an entity subjected to the command, based on the natural language understanding processing result, perform an operation corresponding to the speech based on the command information and the slot information, and generate a response based on a result of performing the operation.

The details of one or more embodiments are set forth in the accompanying drawings and the description below. Other features will be apparent from the description and drawings, and from the claims.

DETAILED DESCRIPTION OF THE EMBODIMENTS

Figure 1:
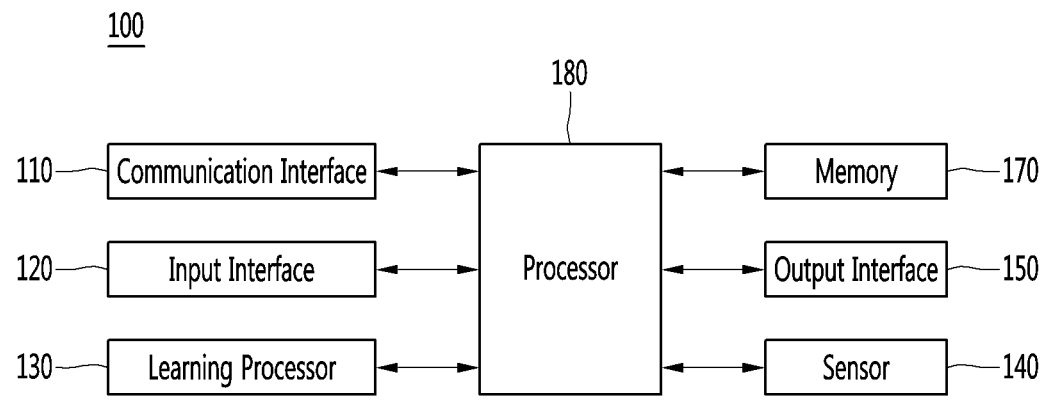
FIG. 1 illustrates an AI device according to an embodiment of the present disclosure.

Hereinafter, embodiments of the present disclosure are described in more detail with reference to accompanying drawings and regardless of the drawings, symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
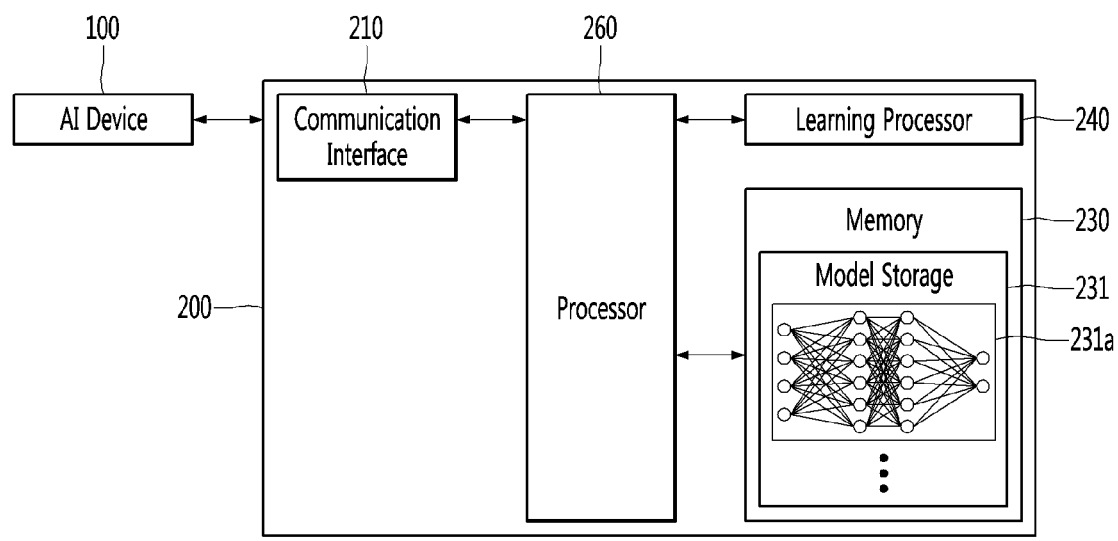
FIG. 2 illustrates an AI server according to an embodiment of the present disclosure.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
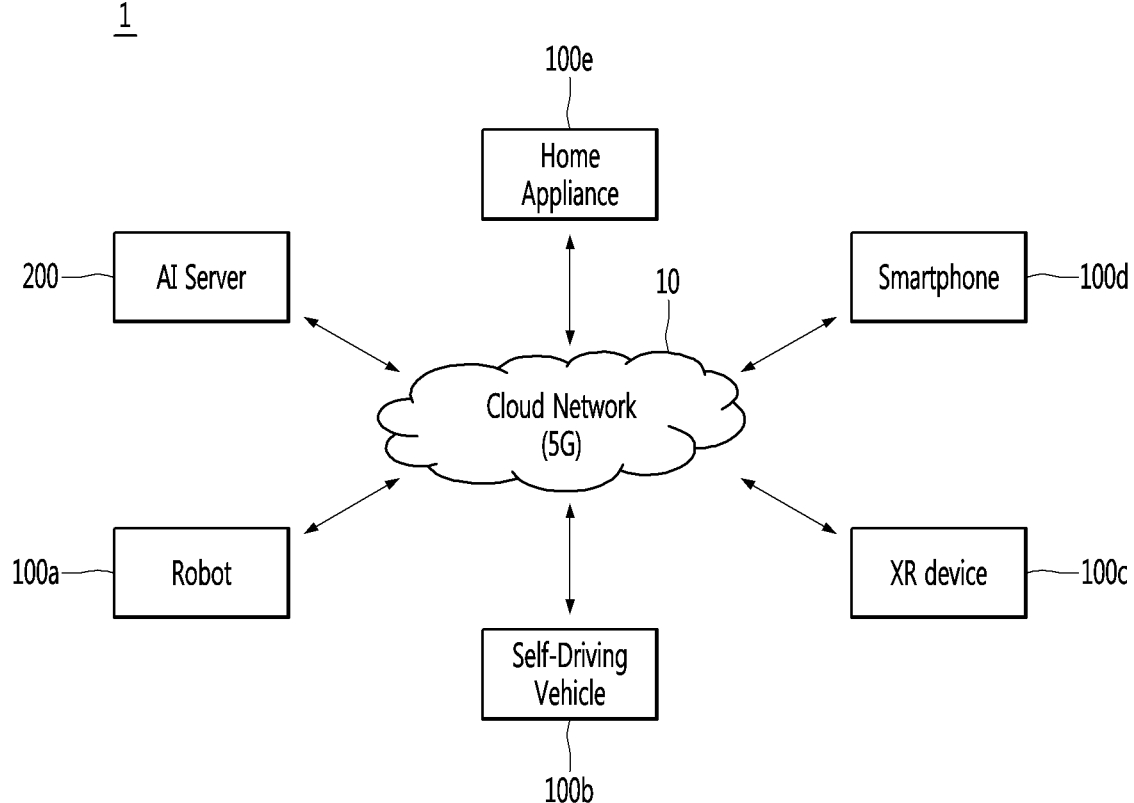
FIG. 3 illustrates an AI system according to an embodiment of the present disclosure.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driver such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driver based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driver such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driver based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
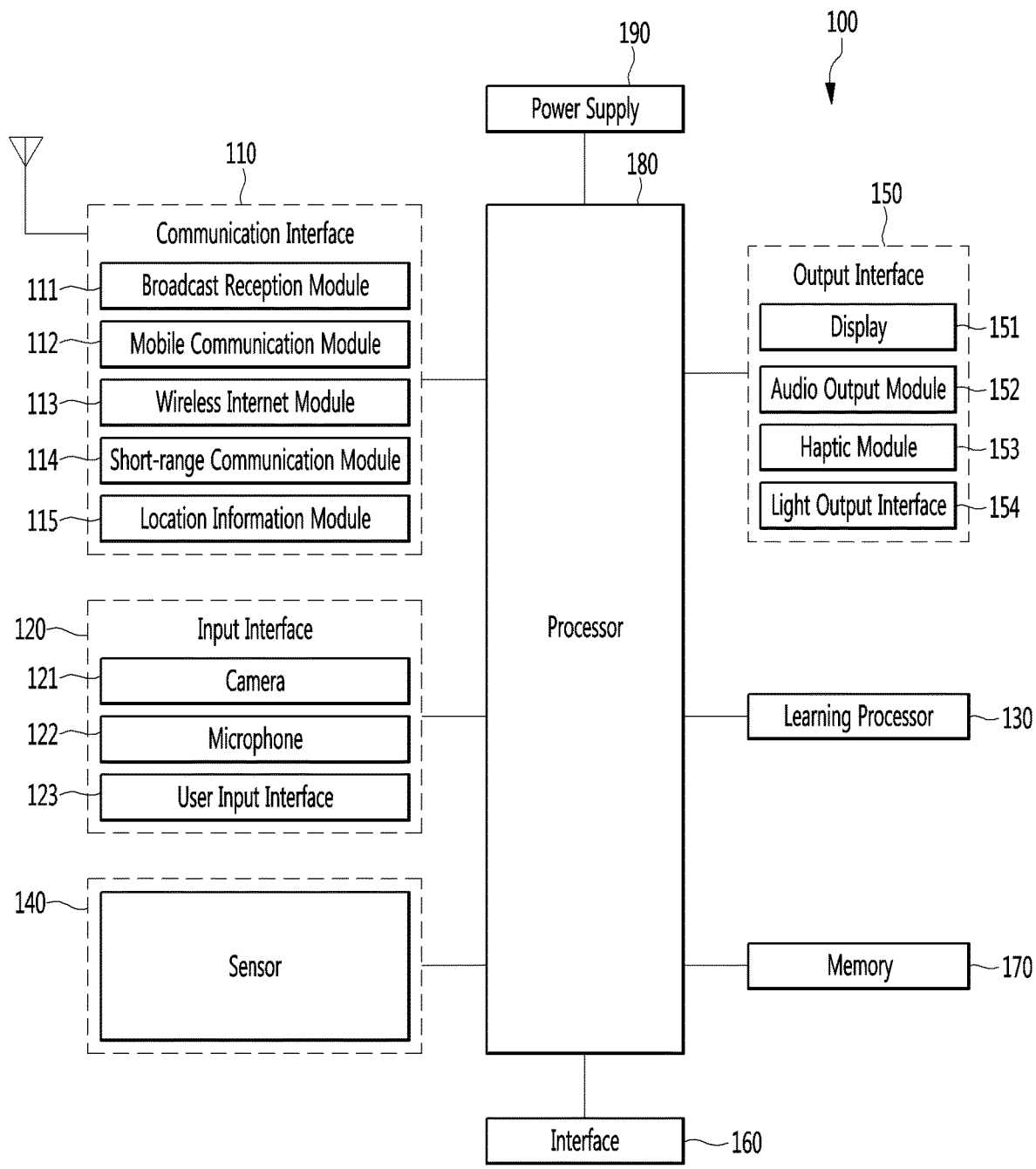
FIG. 4 is a block diagram illustrating an artificial intelligence device according to the present disclosure.

FIG. 4 is a block diagram illustrating an artificial intelligence device according to the present disclosure.

A description overlapping FIG. 1 will be omitted.

The communication interface 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the artificial intelligence device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile artificial intelligence device. Representative examples thereof include a Global Position System (GPS) module or a Wi-Fi module. As one example, when the artificial intelligence device uses a GPS module, the position of the mobile artificial intelligence device may be acquired using a signal sent from a GPS satellite.

The input interface 120 may include a camera 121 for receiving a video signal, a microphone 122 for receiving an audio signal, and a user input interface 123 for receiving information from a user.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the artificial intelligence device 100. Meanwhile, the microphone 122 may include various noise removal algorithms to remove noise generated in the process of receiving the external acoustic signal.

The user input interface 123 receives information from a user. When information is received through the user input interface 123, the processor 180 may control operation of the artificial intelligence device 100 in correspondence with the input information.

The user input interface 123 may include one or more of a mechanical input element (for example, a mechanical key, a button located on a front and/or rear surface or a side surface of the artificial intelligence device 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The output interface 150 is typically configured to output various types of information, such as audio, video, tactile output, and the like. The output interface 150 may include a display 151, an audio output module 152, a haptic module 153, and a light output interface 154.

The display 151 is generally configured to display (output) information processed in the artificial intelligence device 100. For example, the display 151 may display execution screen information of an application program executed by the artificial intelligence device 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the artificial intelligence device 100 and a user, as well as function as the user input interface 123 which provides an input interface between the artificial intelligence device 100 and the user.

The audio output module 152 is generally configured to output audio data received from the wireless communication interface 110 or stored in the memory 170 in a call signal reception mode, a call mode, a record mode, a speech recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output interface 154 may output a signal for indicating event generation using light of a light source of the artificial intelligence device 100. Examples of events generated in the artificial intelligence device 100 may include message reception, call signal reception, a missed call, an alarm, a schedule notice, email reception, information reception through an application, and the like.

An interface 160 serves as an interface with external devices to be connected with the artificial intelligence device 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The artificial intelligence device 100 may perform appropriate control related to the connected external device in correspondence with connection of the external device to the interface 160.

The identification module may be a chip that stores a variety of information for granting use authority of the artificial intelligence device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the artificial intelligence device 100 via the interface 160.

The power supply 190 receives external power or internal power and supplies the appropriate power required to operate respective components included in the artificial intelligence device 100, under control of the processor 180. The power supply 190 may include a battery, and the battery may be a built-in or rechargeable battery.

Meanwhile, as described above, the processor 180 controls operation related to the application program and overall operation of the artificial intelligence device 100. For example, the processor 180 may execute or release a lock function for limiting input of a control command of the user to applications when the state of the mobile artificial intelligence device satisfies a set condition.

Figure 5:
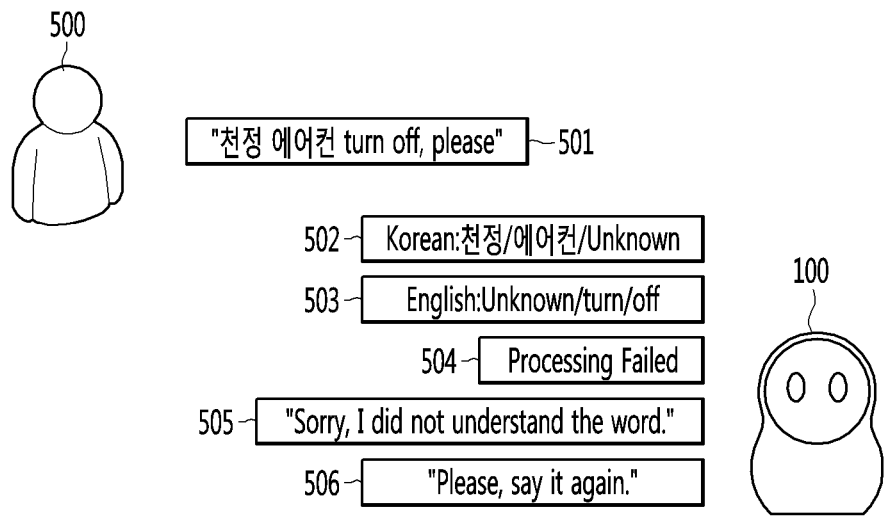
FIG. 5 is a diagram for describing a problem occurring when speech including a plurality of languages is input.

FIG. 5 is a diagram for describing a problem occurring when speech including a plurality of languages is input.

The AI device 100 may acquire speech "천정 에어컨 turn off, please" (501) uttered by the user 500. In this case, the speech "천정 에어컨 turned off, please" 501 uttered by the user 500 is speech including Korean "천정 에어컨" (meaning "ceiling air conditioner" in English) and English "turn off, please".

If the AI device 100 performs natural language understanding processing on the speech 503 uttered by the user 500 based on Korean, the AI device 100 may not recognize the English part "turn off, please" (502). Alternatively, if the AI device 100 performs natural language understanding process based on English, the AI device 100 may not recognize the Korean part "천정 에어컨" (meaning "ceiling air conditioner" in English) (503). Therefore, the natural language processing of the AI device 100 may fail (504).

In this case, the AI device 100 may generate and output a failure response speech such as "Sorry. I didn't understand the word" (505) or "Please, say it again" (506).

Figure 6:
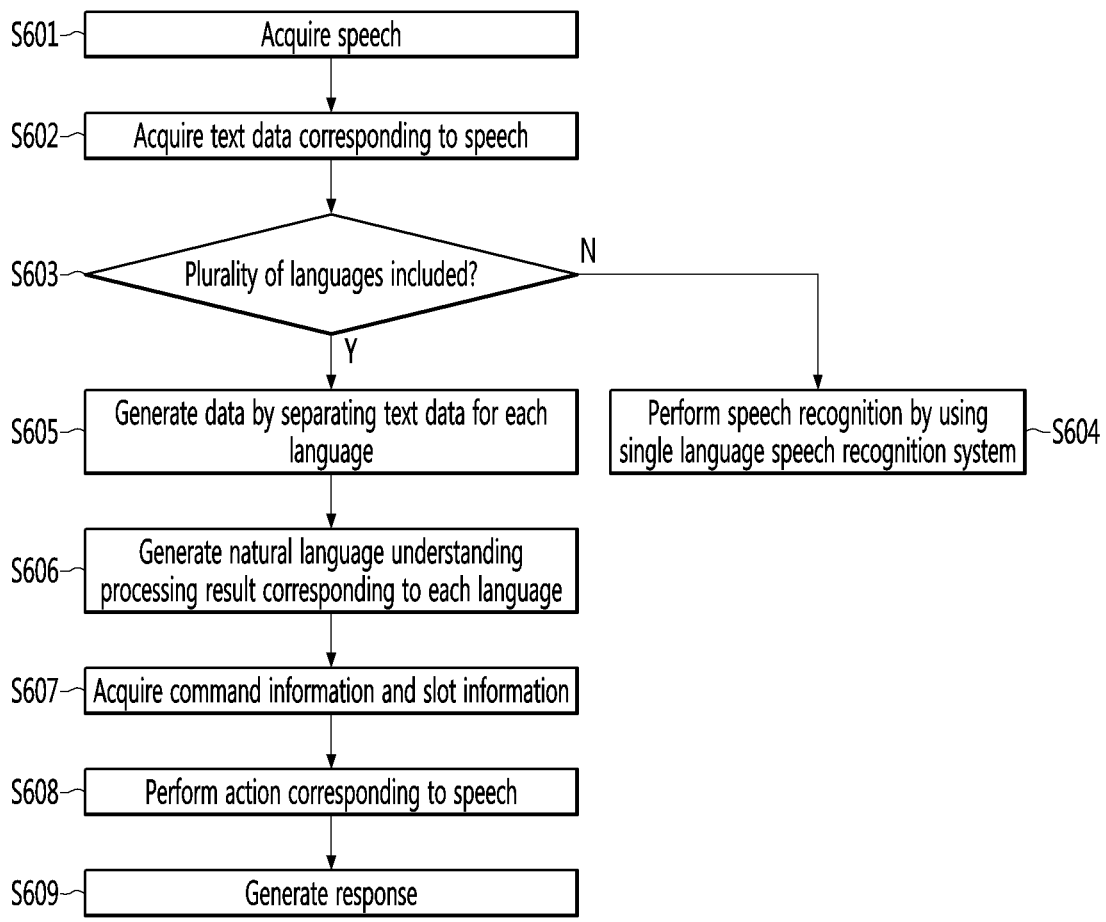
FIG. 6 is a flowchart for describing a speech recognition method according to an embodiment of the present disclosure.

FIG. 6 is a flowchart for describing a speech recognition method according to an embodiment of the present disclosure.

The microphone 122 may acquire speech including a plurality of languages (S601).

The communication interface 110 may receive, from a user device (not illustrated), speech including a plurality of languages input from a user through a speech input module of the user device.

In addition, the processor 180 may acquire speech including a plurality of languages through the microphone 122 or the communication interface 110.

The speech including the plurality of languages may include speech uttered by the user in the plurality of languages, such as "천정 에어컨 turn off, please" (meaning "Please turn off the ceiling air conditioner" in English).

Furthermore, the speech including the plurality of languages may include speech including a bilingual language composed of a first language and a second language. The processor 180 may acquire the speech including the bilingual language composed of the first language and the second language through the microphone 122 or the communication interface 110.

Meanwhile, the processor 180 may generate, from the speech, text data corresponding to the speech (S602).

The processor 180 may generate, from the acquired speech, text data corresponding to the speech by using a speech to text (STT) engine for converting a speech input into a character string.

For example, each language may be recognized with respect to the user's speech "천정 에어컨 turn off, please" (meaning "Please turn off the ceiling air conditioner" in English), and text data corresponding to the speech, that is, "천정 에어컨 turn off, please" (meaning "Please turn off the ceiling air conditioner") may be acquired.

The processor 180 may determine whether the speech includes a plurality of languages based on the text data (S603).

The processor 180 may detect whether the plurality of languages are included in the text data based on a code range for each language of a character encoding system, which is a method of expressing a set of characters or symbols in a computer.

In addition, the processor 180 may output a language type of each of the plurality of detected languages.

Figure 7:
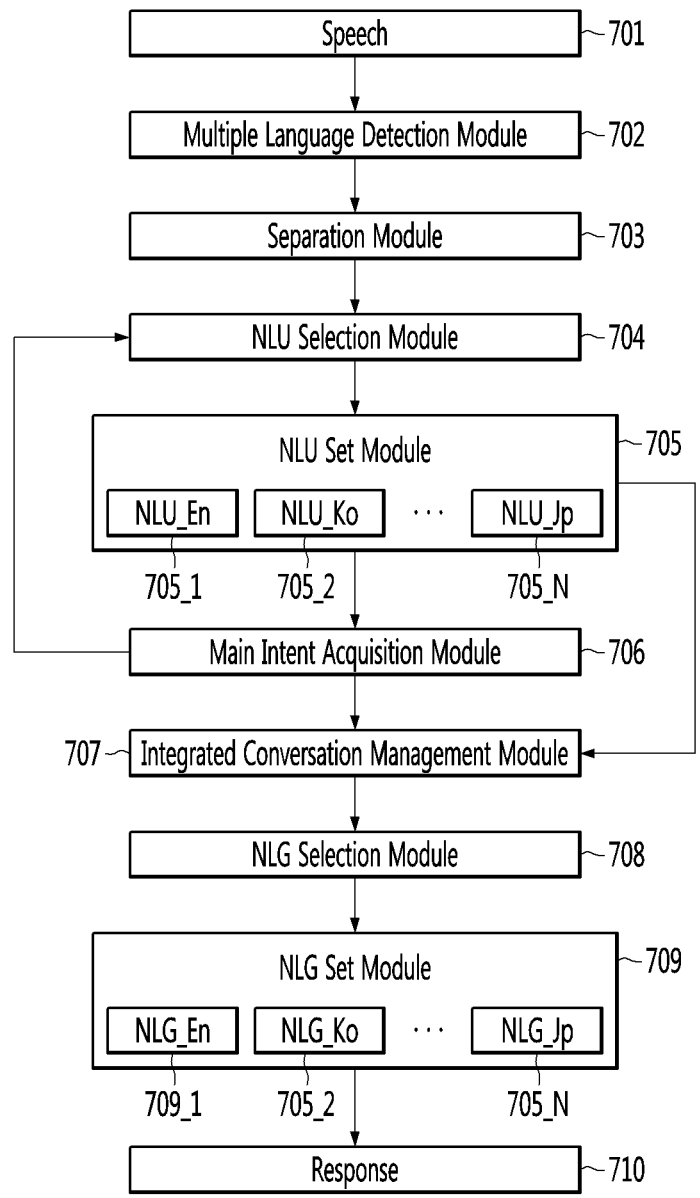
FIG. 7 is a diagram for describing a speech recognition process according to an embodiment of the present disclosure.

Referring to FIG. 7, the processor 180 may include a multiple language detection module 702 that detects whether a plurality of languages are included in speech and outputs a type of the detected language. Meanwhile, each module illustrated in FIG. 7 may be included in the processor 180. In addition, each module illustrated in FIG. 7 may be positioned in the AI device 100 or the AI server 200 and may be controlled by the processor 180. Furthermore, the configuration and function of each module illustrated in FIG. 7 may be operated and performed by the processor 180.

The multiple language detection module 702 may acquire speech 701 including a plurality of languages and determine whether the plurality of languages are included in the acquired speech.

For example, the multiple language detection module 702 may determine whether a plurality of languages are included in speech data acquired by converting the user's speech 701 into a digital signal.

In addition, for example, the multiple language detection module 702 may convert the speech 701 into text data by using the STT engine and determine whether a plurality of languages are included based on the converted text data.

For example, if the text data ["천정 에어컨 turn off, please") (meaning "Please turn off the ceiling air conditioner" in English), the multiple language detection module 702 may generate output data in a format such as ["천정 에어컨 turn off, please": EN, EN].

Meanwhile, if it is determined that the speech does not include the plurality of languages, the processor 180 may perform speech recognition by using a single language speech recognition system (S604).

If it is determined that the speech is composed of a single language, the multiple language detection module 702 included in the processor 180 may be branched to perform the speech recognition by using the single language speech recognition system.

For example, if the processor 180 acquires speech composed of a single language, the processor 180 may perform speech recognition by acquiring intent information by using a natural language processing system for a single language and performing an operation corresponding to the intent information.

Meanwhile, the processor 180 may generate a plurality of pieces of separated data acquired by separating text data for each language (S605).

The processor 180 may generate a plurality of pieces of separated data by separating text data including information about a language type with respect to each language.

In addition, if the user's speech is composed of the first language and the second language, the processor 180 may generate first separated data for the first language and second separated data for the second language.

The separated data may include at least one of a language type, a text corresponding to the speech, main intent or non-intent, intent information, or entity information.

The separated data may include information about a separated language type.

In addition, the separated data may include text data corresponding to speech corresponding to the separated language.

Furthermore, the separated data may include intent information included in the text data. The intent information may mean information about the intent of a talker who uttered the speech.

Furthermore, the separated data may include entity information. The entity information may include information about a predetermined external device, an external home appliance, an external electronic device, and the like. The entity information may include information about an external entity that performs the intent of the talker.

In addition, the separated data may include information about whether the text data included in the separated data corresponds to the main intent of the talker.

Furthermore, the separated data may have a predefined data structure. In this case, the predefined data structure may be a data structure including information necessary for natural language understanding processing to be performed later.

Referring to FIG. 7, the processor 180 may include a separation module 703 that separates text data for each language and generates a plurality of pieces of separated data.

The separation module 703 may separate text data corresponding to the uttered speech for each language.

The separation module 703 may receive text data including information about the detected language type from the multiple language detection module 702. For example, the separation module 703 may receive data such as ["천정 에어컨 turn off, please": EN, EN] from the multiple language detection module 702.

The separation module 703 may generate separated data having a predefined data structure as follows.

[Head/tail:language code:utterance:main intent/informative:initial intent value:main intent value:NE list]

The head/tail may include information about whether the text of the first language included in the separated data is located at the head or the tail of the text of the text of the second language in the original text. The language code may include information about the language type. The utterance may include text data corresponding to speech corresponding to the separated language. The main intent/informative is information indicating whether the separated data is the main intent, and may have a main intent value when the separated data is the main intent and an informative value when the separated data is not the main intent. The initial intent value may include intent information included in text data. The main intent value may include main intent information. The NE list may include entity information.

Meanwhile, the separation module 703 may generate the separated data by separating the data received from the multiple language detection module 702 for each language.

For example, the separation module 703 may separate the data received from the multiple language detection module 702, that is ["천정 에어컨 turn off, please": EN, EN], into first separated data for Korean [head:KO:"천정 에어컨":-:-:-:-] and second separated data for English [tail:EN:"turn off, please":-:-:-:-], and output the separated data. '-' may refer to a blank state where no data is defined. Korean "천정 에어컨" refers to "ceiling air conditioner" in English.

The processor 180 may generate a natural language understanding processing result corresponding to each language with respect to the plurality of pieces of separated data (S606).

The processor 180 may perform natural language understanding processing corresponding to a language of each of the plurality of pieces of separated data to generate a natural language understanding processing result for each of the plurality of pieces of separated data.

Referring to FIG. 7, the processor 180 may include an NLU selection module 704 for selecting a natural language understanding processing module (NLU) corresponding to a language type of each of the plurality of pieces of separated data.

The NLU selection module 704 may receive the plurality of pieces of separated data from the separation module 703.

For example, the NLU selection module 704 may receive, from the separation module 703, the first separated data [head:KO:"천정 에어컨":-:-:-:-] and the second separated data [tail:EN:"turn off, please":-:-:-:-].

The NLU selection module 704 may output the separated data by selecting the natural language understanding processing module (NLU) corresponding to each language type with respect to the received separated data.

The NLU selection module 704 may select a natural language understanding processing module for each language of an NLU set module 705. The NLU set module 705 may include natural language understanding processing modules for various languages, such as an English natural language understanding processing module 705_1, a Korean natural language understanding processing module 705_2, and a Japanese natural language understanding processing module 705_N.

In addition, for example, since the "language code" of the first separated data [head:KO:"천정 에어컨":-:-:-:-] is Korean "KO", the NLU selection module 704 may output the first separated data to the Korean natural language processing module 705_2.

In addition, for example, since the "language code" of the second separated data [tail:EN:"turn off, please":-:-:-:-] is English "EN", the NLU selection module 704 may output the second separated data to the English natural language processing module 705_1.

The processor 180 may perform natural language understanding processing corresponding to each language with respect to the plurality of pieces of separated data.

For example, the processor 180 may perform natural language understanding processing on the first separated data [head:KO:"천정 에어컨":-:-:-:-] by using the Korean natural language understanding processing module 705_2, and may perform natural language understanding processing on the second separated data [tail:EN:"turn off, please":-:-:-:-] by using the English natural language understanding processing module 705_1.

Figure 8:
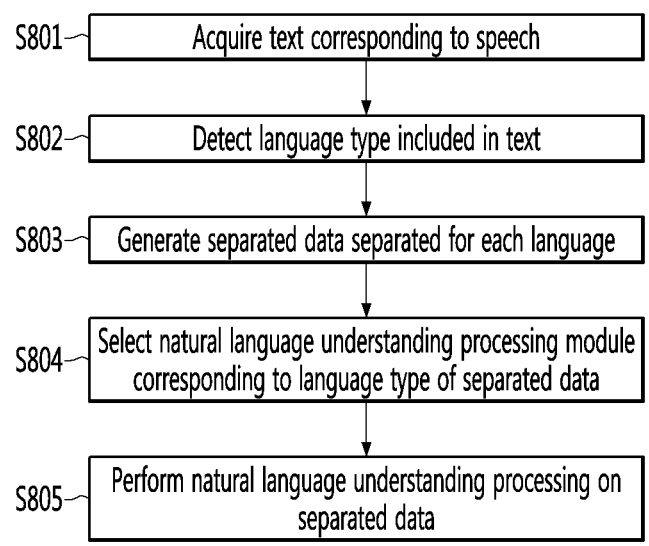
FIGS. 8 and 9 are flowcharts for describing a process of processing speech including a plurality of languages, according to an embodiment of the present disclosure.
Figure 9:
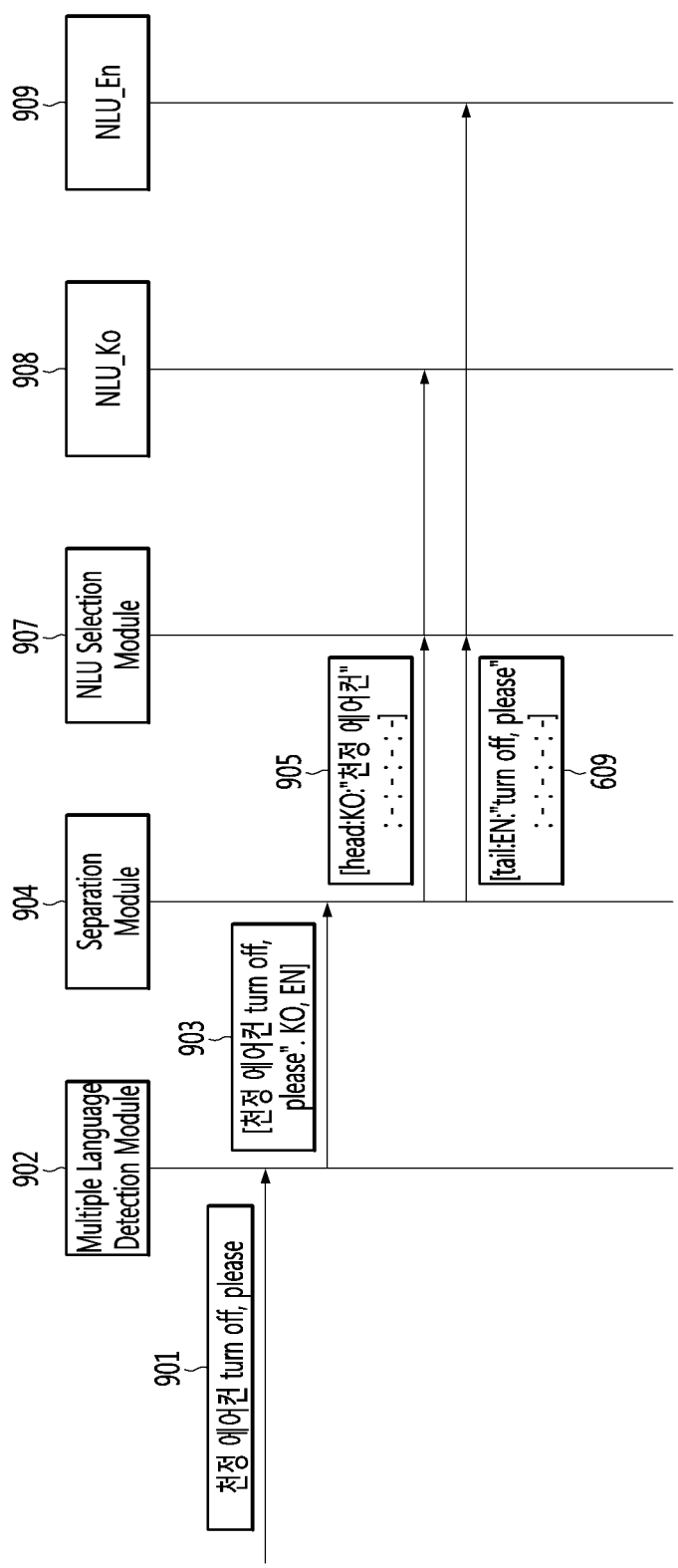

FIGS. 8 and 9 are flowcharts for describing a process of processing speech including a plurality of languages, according to an embodiment of the present disclosure.

The multiple language detection module 902 may acquire text data 901 corresponding to the speech uttered by the user (S801).

In addition, the multiple language detection module 902 may detect the language type included in the text data 901 (S802). The multiple language detection module 902 may detect "Korean: KO" as the first language and "English: EN" as the second language with respect to the text data.

In addition, the multiple language detection module 902 may generate text data 903 including information about the detected language type.

Meanwhile, the separation module 904 may generate the separated data by separating the data received from the multiple language detection module 902 for each language (S803).

For example, the separation module 904 may separate the data 903 received from the multiple language detection module 902 into the first separated data 905 for the first language and the second separated data 906 for the second language.

Meanwhile, the NLU selection module 907 may select a Korean natural language understanding processing module 908 corresponding to Korean, which is the language type of the first separated data 905, and may select an English natural language understanding processing module 909 corresponding to English, which is the language type of the second separated data 906 (S804).

The Korean natural language understanding processing module 908 and the English natural language understanding processing module 909 may perform natural language understanding processing on each of pieces of the received separated data and generate natural language understanding processing results (S805).

The natural language understanding processing results may include at least one of intent information or entity information analyzed from the text data included in each of pieces of the separated data.

The processor 180 may acquire at least one of intent information or entity information about each of pieces of separated data through the natural language understanding processing module for each language.

In addition, the natural language understanding processing results may include main intent information determined based on the intent information of each of pieces of separated data.

Meanwhile, the processor 180 may acquire command information about a command to be instructed by speech and slot information about an entity subjected to the command, based on the natural language understanding processing result (S607).

The command information may include information about a command that the user who uttered speech wants to instruct to the AI device 100 through the speech. For example, a command for an operation required for the AI device 100 may be included.

The slot information may be information about an entity subjected to the command. For example, in the case of the command for the operation required to the AI device 100, the command may include information about an entity to execute the command.

Referring to FIG. 7, the processor 180 may include a main intent acquisition module 706 for acquiring a main intent based on intent information of each of pieces of separated data.

In addition, the processor 180 may include an integrated conversation management module 707 for generating command information and slot information about an entity subjected to the command based on the natural language processing result and performing an operation corresponding to the command.

Figure 10:
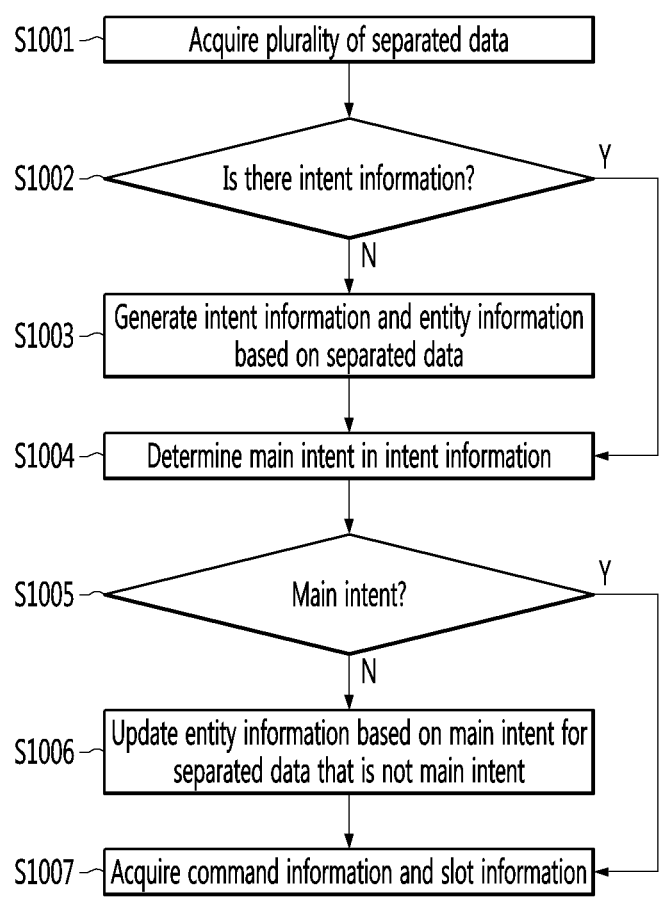
FIGS. 10 and 11 are flowcharts for describing natural language understanding processing according to an embodiment of the present disclosure.
Figure 11:
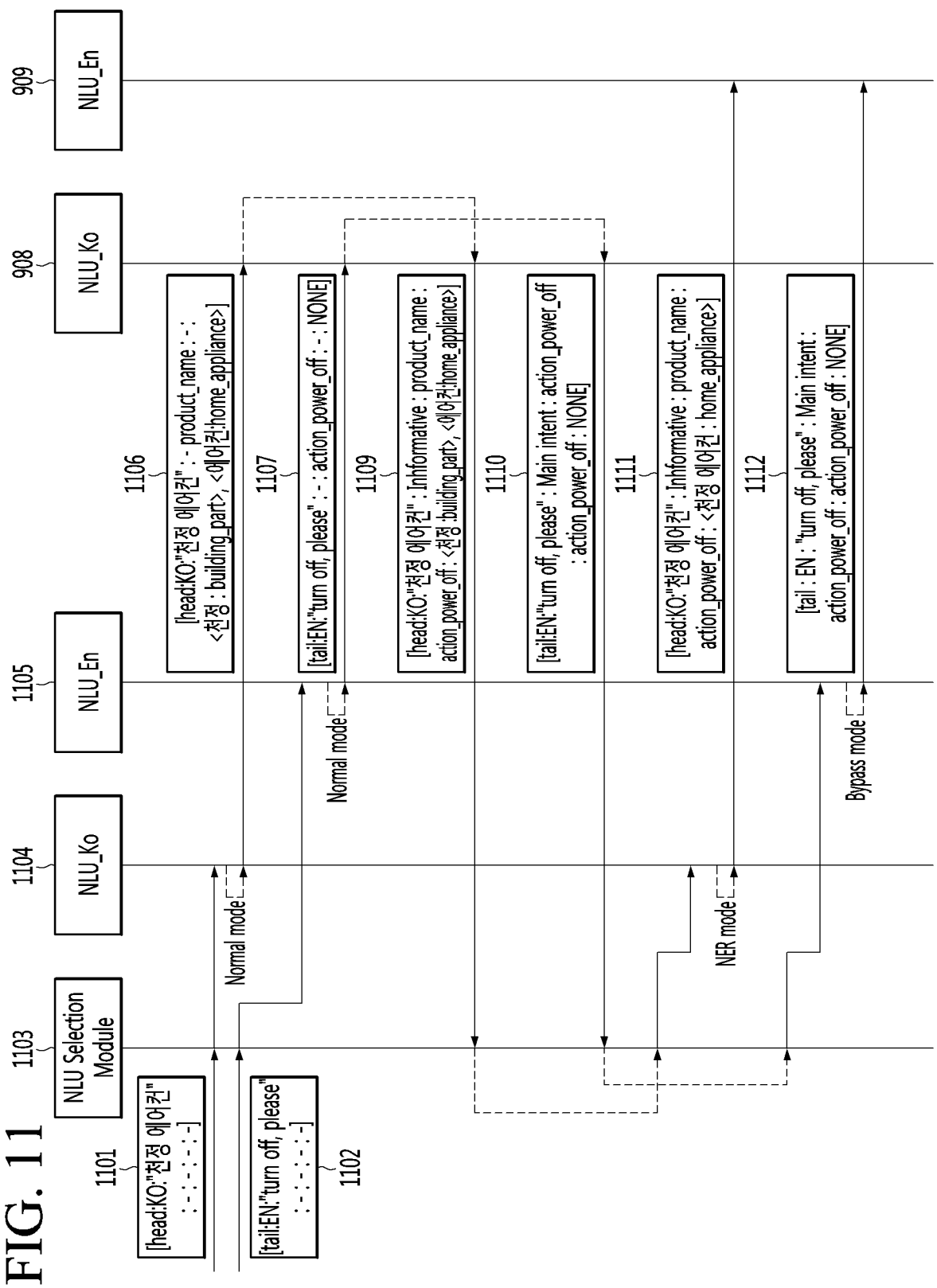

FIGS. 10 and 11 are flowcharts for describing natural language understanding processing according to an embodiment of the present disclosure.

The NLU selection module 1103 may select a Korean natural language understanding processing module 1104 corresponding to Korean, which is the language type of the first separated data 1101, and may select an English natural language understanding processing module 1105 corresponding to English, which is the language type of the second separated data 1102.

Meanwhile, the natural language understanding processing module for each language may acquire each of pieces of the plurality of separated data 1101 and 1102 from the NLU selection module 1103 (S1101).

Each of the natural language understanding processing modules 1104 and 1105 may determine whether there is intent information for each of pieces of the separated data.

For example, each of pieces of the separated data that is first input to the natural language understanding processing module may not include intent information.

The natural language understanding processing module may operate in various modes according to the state of the separated data. For example, the natural language understanding processing module may operate in a first mode "normal mode", a second mode "NEER mode" and a third mode "bypass mode". The first mode may be a mode that operates on separated data that does not include the intent information, the second mode may be a mode that operates on separated data other than the main intent, and the third mode may be a mode that operates on the separated data that is the main intent.

Each of the natural language understanding processing modules 1104 and 1105 may generate intent information and entity information for each of pieces of separated data that does not include intent information (S1103).

For example, the Korean natural language understanding processing module 1104 determines that the user intends to utter a product name, based on the text data "찬성 에어컨" (meaning "ceiling air conditioner" in English) of the first separated data 1101, and generate intent information "product_name". In addition, the Korean natural language understanding processing module 1104 may generate entity information <찬정 (meaning "ceiling" in English):building_part>, <에어컨 (meaning "air conditioner" in English):home_appliance>, which is information about the entity of intent.

In addition, for example, the English natural language understanding processing module 1105 may determine that the intent of the utterance is an operation of tuning off power, based on the text data "turn off, please" of the second separated data 1102, and generate intent information "action_power_off" Furthermore, since information about the entity of intent is not detected from the text data "turn off, please", the English natural language understanding processing module 1105 may generate entity information as "NONE".

Therefore, the processor 180 may acquire at least one of intent information or entity information about each of pieces of the separated data through the natural language understanding processing module.

Meanwhile, a main intent selection module 1108 may receive separated data including intent information from the natural language understanding processing module.

For example, the main intent selection module 1108 may receive first separated data 1106 and second separated data 1107 including the intent information.

In addition, the main intent selection module 1108 may determine the main intent among pieces of the intent information included in each of pieces of the separated data (S1104).

Furthermore, the main intent selection module 1108 may determine the main intent according to the priority of the preset intent information. For example, if the priority of the intent information is "action", "question", and "product name", the main intent selection module 1108 may determine the intent information included in the separated data, whose intent information is the operation, as the main intent.

In addition, the main intent selection module 1108 may determine the main intent according to priority of a sentence type of text data.

For example, if the sentence type is prioritized in the order of an imperative sentence, an interrogative sentence, a declarative sentence, and an exclamation sentence, the main intent selection module may determine intent information included in the separated data, whose sentence type is the imperative sentence, as the main intent.

Furthermore, the main intent selection module 1108 may determine, as the main intent, the intent information of the separated data including the text headed before the text of the other language in the original text.

The main intent selection module 1108 may receive the first separated data 1106 and the second separated data 1107 including the intent information and determine the main intent among the intent information "product_name" and "action_power_off" as "action_power_off". The main intent selection module 1108 may include information about the main intent in the separated data.

In addition, the main intent selection module 1108 may include an "informative" value in the separated data 1109, which is not the main intent, and include information indicating that the main intent is "action_power_off". Furthermore, the main intent selection module 1108 may include a "main intent" value in the separated data 1110 corresponding to the main intent, and include information indicating that the main intent is "action_power_off".

The main intent selection module 1108 may output the processed separated data 1109 and 1110 to the NLU selection module after selecting the main intent. The NLU selection module 1103 may select the natural language understanding processing module according to the language type of each of pieces of the received separated data.

Meanwhile, the natural language understanding processing module may determine whether the received separated data includes the intent information determined as the main intent (S1005).

The natural language understanding processing module may update the entity information based on the main intent for the separated data that is not the main intent (S1006).

For example, the Korean natural language understanding processing module 1104 may update the entity information <천정 (ceiling):building_part> and <에어컨 (air conditioner):home_appliance> with <천정 에어컨 (ceiling air conditioner):home_appliance> based on the main intent "action_power_off" for the separated data 1109 including the intent information that is not determined as the main intent. Since the main intent is "action_power_off", the Korean natural language understanding processing module 1104 may perform an operation of updating a device to be operated with entity information. Therefore, the Korean natural language understanding processing module 1104 may update the entity information with <천정 에어컨 (ceiling air conditioner:home_appliance>. The Korean natural language understanding processing module 1104 may output the separated data 1111, whose the entity information is updated, to the integrated conversation management module 1113.

The processor 180 may include an integrated conversation management module 1113 for generating command information for a command to be instructed by speech and slot information about an entity subjected to the command, based on the natural language processing result.

Therefore, the processor may update, based on the main intent, entity information included in the separated data including intent information that is not determined as the main intent. Thus, even if the main intent is uttered in English and the entity subjected to the main intent is uttered in Korean, the processor 180 may accurately acquire the main intent and the entity information subjected to the main intent.

Meanwhile, the English natural language understanding processing module 1105 may output, to the integrated conversation management module 1113, the separated data 1110 including the intent information determined as the main intent.

The integrated conversation management module 1113 may acquire command information and slot information based on the plurality of pieces of separated data 1111 and 1112 received as a result of the natural language understanding processing (S1007).

Figure 12:
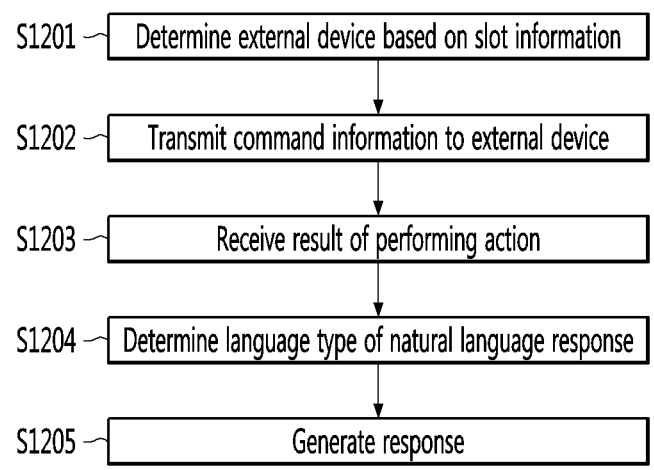
FIGS. 12 and 13 are flowcharts for describing a method for performing an operation corresponding to a speech command, according to an embodiment of the present disclosure.
Figure 13:
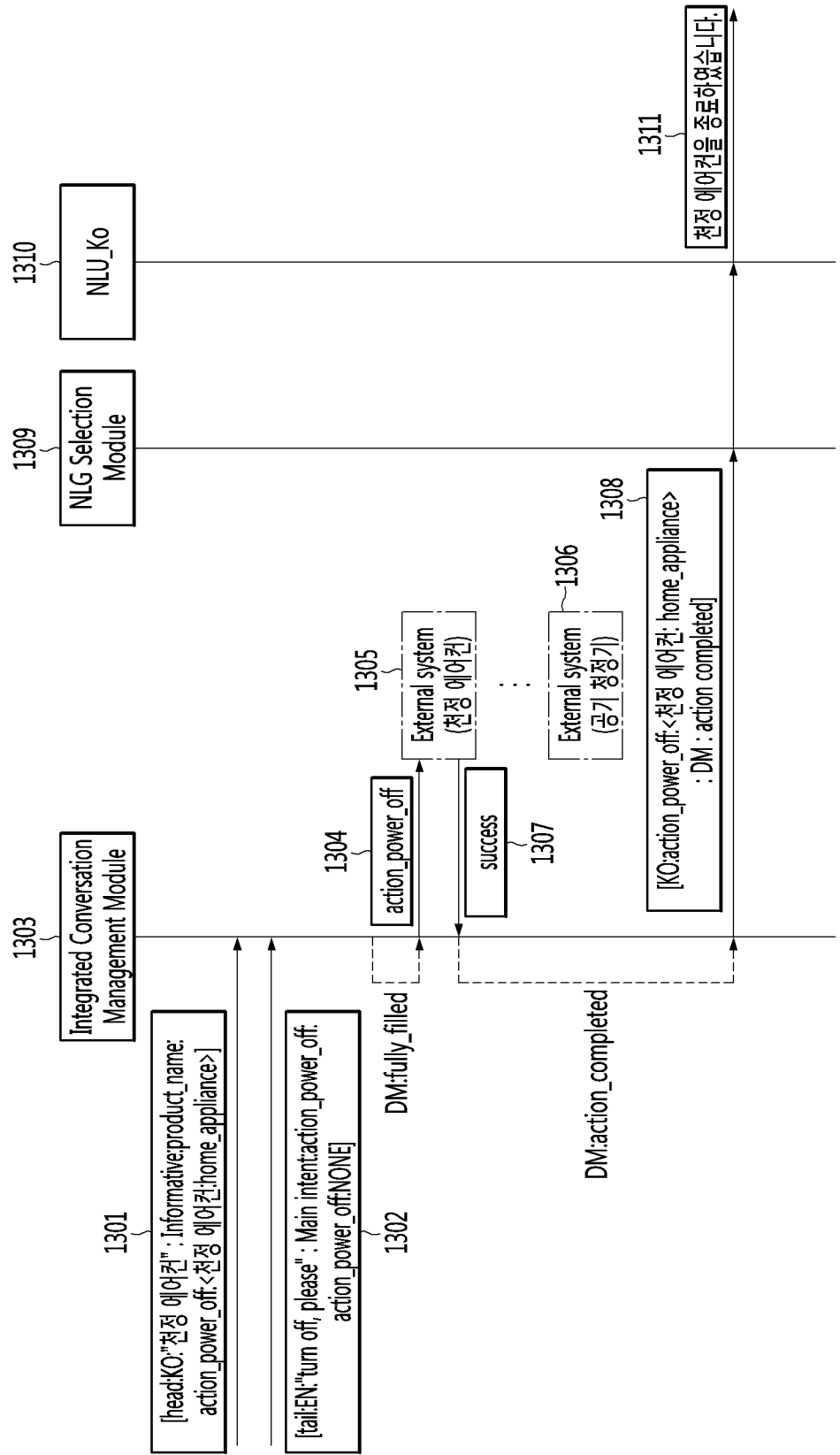

FIGS. 12 and 13 are flowcharts for describing a method for performing an operation corresponding to a speech command, according to an embodiment of the present disclosure.

The integrated conversation management module 1303 may receive the first separated data 1301 and the second separated data 1302 from the natural language understanding processing module.

The integrated conversation management module 1303 may acquire command information about a command to be instructed by speech, based on the intent information about the separated data corresponding to the main intent.

For example, the integrated conversation management module 1303 may acquire the command information "action_power_off" based on the intent information "action_power_off" of the second separated data 1302 including the main intent.

In addition, the integrated conversation management module 1303 may acquire slot information about the entity subjected to the command based on the entity information about each of pieces of the input separated data.

The integrated conversation management module 1303 may acquire slot information corresponding to the main intent based on the entity information.

For example, when the main intent is "action_power_off", the essential slot information corresponding to the main intent may be a home appliance (home_appliance) or an electronic device (electronic_device).

The integrated conversation management module 1303 may acquire slot information about the entity subjected to the command, that is, "<천정 에어컨 (ceiling air conditioner):home_appliance>", based on the entity information "<천정 에어컨 (ceiling air conditioner):home_appliance>" acquired from the first separated data 1301 and the second separated data 1302.

When all essential slot information corresponding to the main intent is acquired from the separated data, the integrated conversation management module 1303 may perform an operation corresponding to the speech.

For example, the integrated conversation management module 1303 may determine that the home appliance "<천정 에어컨 (ceiling air conditioner):home_appliance>", which is essential slot information corresponding to the main intent "action_power_off", has been acquired and perform an operation corresponds to the speech. The integrated conversation management module 1303 may update state information "DM:fully_filled" when all essential slot information is acquired.

Meanwhile, the processor 180 may perform the operation corresponding to the speech based on the command information and the slot information (S608). It may mean an operation indicated by the talker corresponding to the speech. In addition, the operation corresponding to the speech may refer to an operation corresponding to the command information.

The processor 180 may determine an external device that performs the operation corresponding to the command information based on the slot information (S1201).

The external device may be devices connected to the AI device 100 through wired or wireless communication. For example, the external device may include a ceiling air conditioner 1305 and an air cleaner 1306.

The integrated conversation management module 1303 may determine that the external device to perform the operation corresponding to the command information 1304 is the ceiling air conditioner 1305, based on the slot information.

In addition, the processor 180 may transmit the command information to the external device through the communication interface 110 (S1202).

For example, the integrated conversation management module 1303 may transmit the command information "action_power_off" 1304 to the ceiling air conditioner 1305 through the communication interface 110.

In addition, the processor 180 may receive a result of performing the operation corresponding to the command information from the external device through the communication interface 110 (S1203).

For example, the integrated conversation management module 1303 may receive "success" 1307 as a result of performing the operation corresponding to the command information from the external device through the communication interface 110.

In addition, if the external device completes the operation, the integrated conversation management module 1303 may update the state information with "DM:action_completed".

Meanwhile, the processor 180 may generate a response based on a result of performing the operation (S1205).

The processor 180 may generate a natural language response based on the language type included in the separated data corresponding to the main intent.

For example, after completing the operation, the integrated conversation management module 1303 may transmit, to a natural language generation (NLG) selection module 1309, state data 1308 including at least one of a language type, command information, slot information, or status information included in the separated data corresponding to the main intent.

The NLG selection module 1309 may select a natural language response generation module based on the language type included in the separated data corresponding to the main intent.

For example, the NLG selection module 1309 may select a Korean natural language response generation module 1310 corresponding to Korean "KO" that is the language type included in the state data 1308.

In addition, the NLG selection module 1309 may select a natural language response generation module based on a preset language.

Meanwhile, the natural language response generation module may generate a natural language response based on state information about the result of performing the operation.

For example, the Korean natural language response generation module 1310 may generate a response speech corresponding to the Korean language "KO", that is, "천정 에어컨을 종료하였습니다" (meaning that "The ceiling air conditioner has been turned off" in English), based on the information "action_completed" indicating the end command "action_power_off" has been ended for the slot information "ceiling air conditioner".

Meanwhile, the processor 180 may output the response speech through the audio output module 152.

According to an embodiment of the present disclosure, even if the user utters multiple languages, the uttered speech may be recognized and processed.

In addition, according to various embodiments of the present disclosure, it is possible to determine an accurate speech intent from the speech including a plurality of languages.

According to various embodiments of the present disclosure, if the user utters a plurality of languages, a natural user experience may be provided by selecting an appropriate language and generating and outputting a response speech.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the artificial intelligence apparatus.

What is claimed is:

1. A method comprising:
   acquiring speech including a plurality of languages;
   generating, from the speech, text data corresponding to the acquired speech;
   generating a plurality of separated data acquired by separating the generated text data according to each language of the plurality of languages;
   performing natural language processing for each of the plurality of separated data based on each corresponding language to generate a natural language processing result for the plurality of separated data;
   acquiring command information and slot information based on the natural language processing result, wherein the command information corresponds to a command that is instructed based on the speech and the slot information corresponds to a subject of the command information;
   causing an operation to be performed corresponding to the speech based on the acquired command information and the acquired slot information; and
   generating a response based on performance of the operation.

2. The method of claim 1, wherein the plurality of languages includes a first language and a second language, and
   wherein the plurality of separated data includes first separated data for the first language and second separated data for the second language.

3. The method of claim 1, wherein the separated data comprise at least one of a language type, a text corresponding to the acquired speech, a main intent, a non-intent, intent information, or subject information.

4. The method of claim 1, wherein the natural language processing result is generated by acquiring at least one of intent information or subject information about each of the plurality of separated data.

5. The method of claim 4, wherein the natural language processing result is generated by determining main intent in the intent information included in the plurality of separated data, wherein the main intent is information indicating whether the separated data corresponds to a primary purpose of the speech.

6. The method of claim 5, wherein the natural language processing result is further generated by updating subject information included in the separated data based on the main intent.

7. The method of claim 5, wherein the slot information are acquired by acquiring slot information corresponding to the main intent based on the subject information.

8. The method of claim 5, wherein generating the response further comprises generating a natural language response based on a language type of the separated data corresponding to the main intent.

9. The method of claim 1, wherein causing the operation to be performed comprises:
   determining an external device configured to perform the operation corresponding to the command information based on the slot information;
   transmitting the command information to the external device; and
   receiving, from the external device, a result of performing the operation corresponding to the command information.

10. The method of claim 1, further comprising determining the plurality of languages included in the generated text data based on a code range for each language of a character encoding system.

11. An artificial intelligence device comprising:
   a microphone configured to acquire speech including a plurality of languages; and
   a processor configured to:
   generate, from the speech, text data corresponding to the acquired speech;
   generate a plurality of pieces of separated data acquired by separating the generated text data according to each language of the plurality of languages;
   perform natural language processing for each of the plurality of separated data based on each corresponding language to generate a natural language processing result for the plurality of separated data;
   acquire command information and slot information based on the natural language processing result, wherein the command information corresponds to a command that is instructed based on the speech and the slot information corresponds to a subject of the command information;

causing an operation to be performed corresponding to the speech based on the acquired command information and the acquired slot information; and generate a response based on performance of the operation.

12. The artificial intelligence device according to claim 11, wherein the plurality of languages includes a first language and a second language, and wherein the plurality of separated data includes first separated data for the first language and second separated data for the second language.

13. The artificial intelligence device according to claim 11, wherein the separated data comprise at least one of a language type, a text corresponding to the acquired speech, a main intent, a non-intent, intent information, or subject information.

14. The artificial intelligence device according to claim 11, wherein the natural language processing result is generated by acquiring at least one of intent information or subject information about each of the plurality of separated data.

15. The artificial intelligence device according to claim 14, wherein the natural language processing result is generated by determining main intent in the intent information included in the plurality of pieces of separated data, wherein the main intent is information indicating whether the separated data corresponds to a primary purpose of the speech.

16. The artificial intelligence device according to claim 15, wherein the natural language processing result is further generated by updating subject information included in the separated data based on the main intent.

17. The artificial intelligence device according to claim 15, wherein the slot information are acquired by acquiring slot information corresponding to the main intent based on the subject information.

18. The artificial intelligence device according to claim 15, wherein generating the response further comprises generating a natural language response based on a language type of the separated data corresponding to the main intent.

19. The artificial intelligence device according to claim 11, wherein the causing the operation to be performed comprises:

determining an external device configured to perform the operation corresponding to the command information based on the slot information;

transmitting the command information to the external device; and receiving, from the external device, a result of performing the operation corresponding to the command information.

20. The artificial intelligence device according to claim 11, wherein the processor is further configured to determine the plurality of languages included in the generated text data based on a code range for each language of a character encoding system.

* * * * *